United States Patent
Takagi et al.

(12)

(10) Patent No.: US 6,642,739 B2
(45) Date of Patent: Nov. 4, 2003

(54) METHOD AND DEVICE FOR MAGNETIZING AND INSPECTING A ROTOR FOR MAGNETO GENERATORS

(75) Inventors: Kazuyoshi Takagi, Mori-machi (JP); Takahiro Yamamoto, Mori-machi (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 09/681,551

(22) Filed: Apr. 27, 2001

(65) Prior Publication Data

US 2002/0158657 A1 Oct. 31, 2002

(51) Int. Cl.$^7$ .................... G01R 31/34; G01R 33/00
(52) U.S. Cl. ................ 324/772; 324/260; 324/262; 324/263
(58) Field of Search ............... 324/772, 604, 324/260, 262, 263, 205, 207.13

(56) References Cited

U.S. PATENT DOCUMENTS

| | | | | |
|---|---|---|---|---|
| 4,056,770 A | * | 11/1977 | Mohr et al. ............. 324/205 |
| 4,057,045 A | * | 11/1977 | Stellwagen .......... 123/146.5 A |
| 4,307,698 A | * | 12/1981 | Yoshinari ............ 123/146.5 A |
| 4,591,785 A | * | 5/1986 | Hoehn, Jr. ................ 324/220 |
| 5,134,368 A | * | 7/1992 | Otaka et al. ............. 324/219 |
| 5,245,279 A | * | 9/1993 | Bendzsak ............. 324/207.26 |
| 5,345,669 A | * | 9/1994 | Zigler et al. ................ 29/598 |
| 5,747,988 A | * | 5/1998 | Suzuma ................... 324/225 |
| 5,914,596 A | * | 6/1999 | Weinbaum ................ 324/228 |
| 6,239,525 B1 | * | 5/2001 | Matsunobu et al. ... 310/156.38 |

FOREIGN PATENT DOCUMENTS

| | | |
|---|---|---|
| JP | 09 294355 | 11/1997 |
| JP | 2000-55882 | 2/2000 |

OTHER PUBLICATIONS

French Search Report dated Mar. 22, 2002.
Patent Abstracts of Japan, vol. 2000, No. 05, Sep. 14, 2000 & JP 2000 055882 A(Moriyama Kogyo KK), Feb. 25, 2000.
Patent Abstracts of Japan, vol. 1998, No. 03, Feb. 27, 1998 & JP 09 294355 A (Honda Motor Co., Ltd), Nov. 11, 1997.

* cited by examiner

*Primary Examiner*—N. Le
*Assistant Examiner*—John Teresinski
(74) *Attorney, Agent, or Firm*—Ernest A Beutler

(57) ABSTRACT

A single apparatus for magnetizing permanent magnet segments mounted on a cylindrical shell for use in a flywheel magneto or the like. Not only are the segments magnetized but also their magnetic strength is measured when the magnetized element is moved out of the magnetizing section. Prior to that, however, the circumferential location of the timing mark on the flywheel is also verified, within the single apparatus.

42 Claims, 5 Drawing Sheets

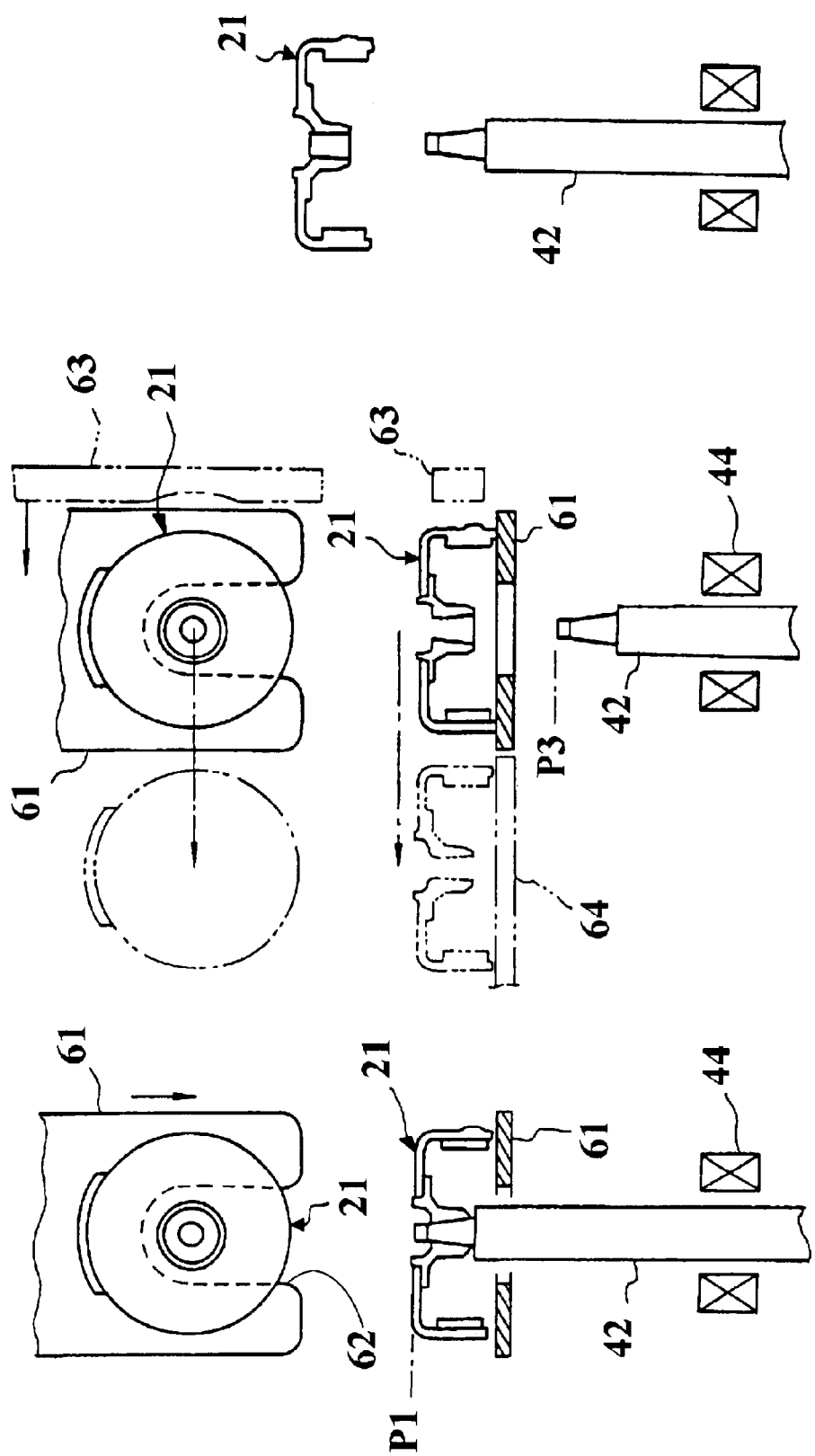

METHOD AND DEVICE FOR MAGNETIZING AND INSPECTING A ROTOR FOR MAGNETO GENERATORS

BACKGROUND OF INVENTION

This invention relates to a method and device for magnetizing and inspecting a permanent magnet assembly of a rotating electric machine and more particularly the rotor for a magneto generator.

Many types of rotating electrical machines employ a plurality of magnetic segments secured to a cylindrical member and which cooperate with an associated plurality of coil windings. One form of device of this type is the magneto generator that is utilized with many types of internal combustion engines for generating electrical power and also for firing the ignition devices of the engine.

With this type of mechanism, a plurality of segments are mounted on a cylindrical member such as the engine flywheel and formed from materials, such as alnico-base, ferrite-base, rare earth cobalt based or neodymium-iron boron magnets, which are bonded to the rotor. These materials once bonded are then magnetized by a suitable device so as to define the desired pole arrangement. Generally after the entire segments are magnetized, then the resulting assembly is tested to make sure that it is appropriately magnetized. This is done by positioning the cylinder body in a machine where it is rotated at a relatively high speed such as about 1500 rpm and the magnetic properties are tested with a coil winding. This requires rather expensive equipment.

In addition, when utilized as a magneto generator or flywheel magneto, it is the practice to form a timing mark on the cylinder body that cooperates with an appropriate sensor for sensing the angular position of the crankshaft. This assist in setting the timing for firing of the spark plug or plugs of the associated engine. Obviously it is important that this timing mark be accurately located relative to the plurality of magnets.

Thus, it is the practice also to rotate the flywheel with a sensor device so as to determine that the timing mark is appropriately located relative to the poles of the magnets. Obviously this takes several steps and actually frequently results in the necessity to move the flywheel from one apparatus to another each of which has a drive for the flywheel. Obviously this adds costs and takes up space.

A device has been proposed where the magnetizing coil is fitted with Hall elements and the distribution of the flux density (gauss value) is measured while being rotating after magnetization. Also a drive is required for rotating the flywheel at a relatively slow speed such as about 3 rpm. While this is being done, the outer surface of the rotor can be detected by laser sensor to determine that the timing mark is appropriately positioned. However, this again requires movement of the magnetized part from one piece of equipment to another and has some further objectionable characteristics.

It is, therefore, a principal object to this invention to provide an improved apparatus, which can both magnetize the permanent magnet materials and also in the same apparatus, test the magnetic properties after they have been magnetized.

It is a further object to this invention to provide an improved testing device of the type set forth in the preceding paragraph where the position and size of the timing mark can be accurately determined in the same apparatus.

SUMMARY OF INVENTION

A first feature of this invention is adapted to be embodied in a magnetizing and testing apparatus and a method for magnetizing a plurality of circumferentially spaced magnetic materials mounted on a cylindrical body and testing the results of the magnetization.

In accordance with another feature of the invention, the testing apparatus also tests the magnetic properties when moving the cylindrical body out of the magnetizing field so as to minimize the number of steps of operation and avoid the necessity of rotating the device in order to sense its magnetic properties.

In accordance with a still further feature of the invention, the method and apparatus also tests the size, location and height of a timing mark formed on the cylindrical body when in the apparatus.

BRIEF DESCRIPTION OF DRAWINGS

FIG. 8 is a view, in part similar to FIG. 5, and shows how the component is positioned for removal from the testing apparatus.

FIG. 9 is a view, in part similar to FIG. 8, and shows the removal step.

FIG. 10 is a view, in part similar to FIG. 4, but showing the preparation for assembly of a next device to be tested into the apparatus.

DETAILED DESCRIPTION

Figure 1:
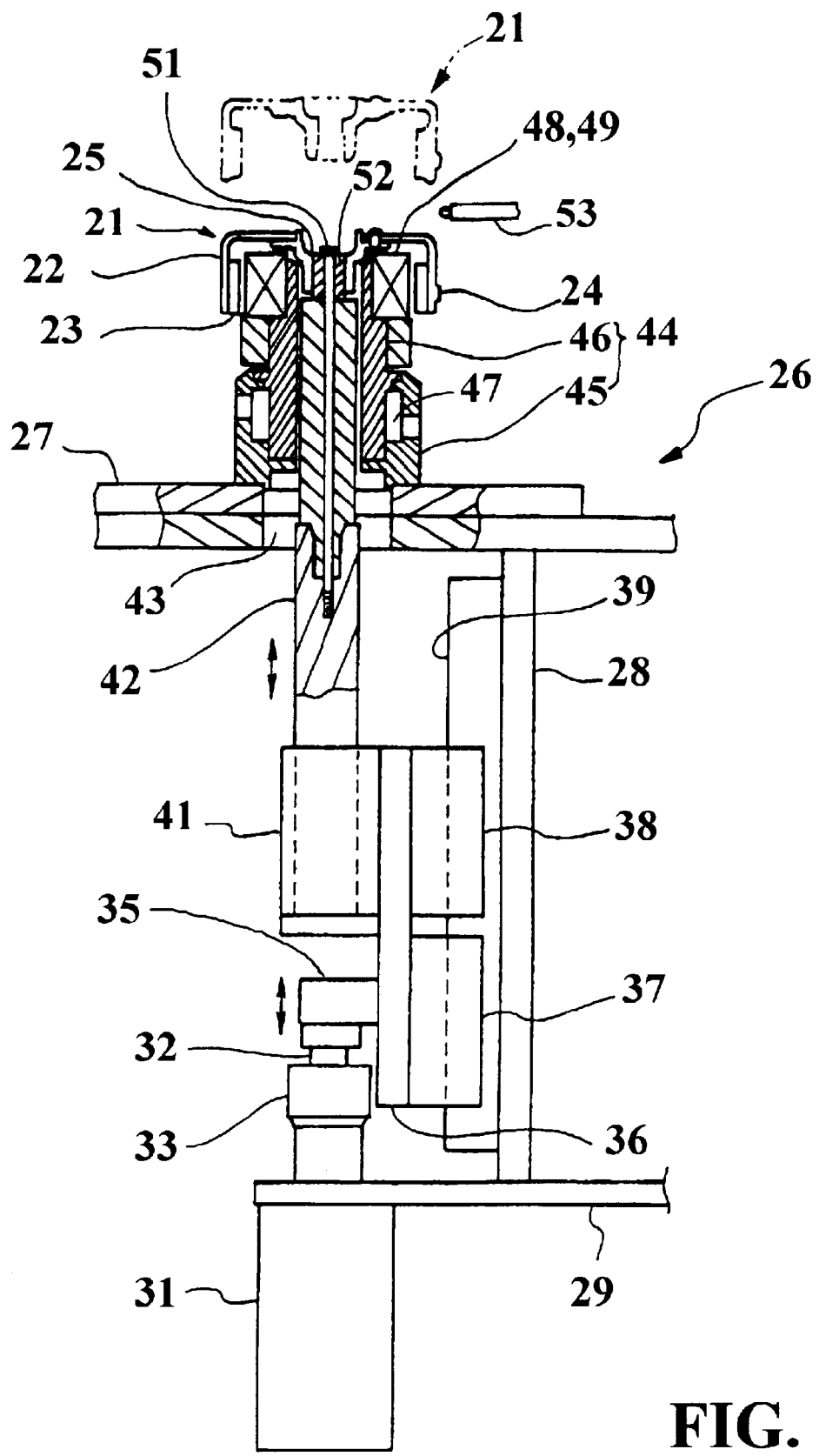
FIG. 1 is a side elevational view of an apparatus embodying the invention and adapted to practice a method in accordance with the invention, with a portion broken away and with the components to be magnetized and tested prior to assembly onto the apparatus, as shown in phantom lines, and mounted on the apparatus.
Figure 2:
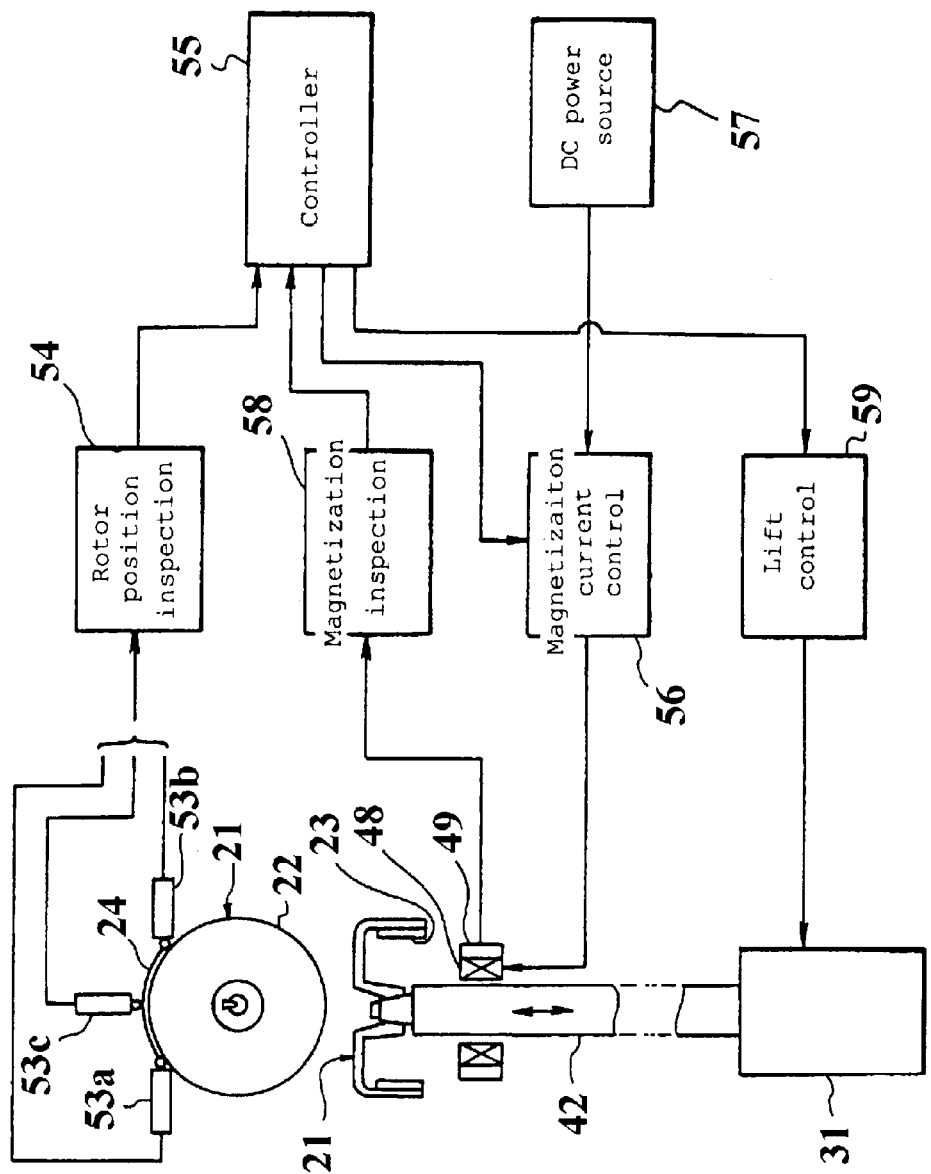
FIG. 2 is a schematic view, in part similar to FIG. 1, but also containing a top view showing the relationship of the apparatus to the various controls for the apparatus that practice the invention.

Referring first primarily to FIGS. 1 and 2, these are figures that show the magnetization and testing apparatus for a component of a rotating electrical machine, indicated generally by the reference numeral 21. In the illustrated example the component 21 is a flywheel magneto for an internal combustion engine. This comprises an inverted cup shaped shell 22. Mounted on the interior cylindrical surface of the shell 22 are pluralities of arcuate segments 23 formed from a material such as alnico-based, ferrite-based, rare earth cobalt-based or neodymium-iron boron materials that can be easily and permanently magnetized.

In addition, the outer surface of the cylindrical portion of the shell 22 is formed with an embossment that is comprised of a raised timing mark 24 formed at an accurate angular position on the shell 22. Affixed to the end wall of the shell 22 is a hub portion 25. The hub portion 25 is formed with a key-way for accurate angular attachment to a crankshaft of an associated internal combustion engine.

In such use, the permanent magnets, formed when the segments 23 are magnetized, cooperate with coils of a winding for generating an alternating electrical current. Of course, although the invention can be utilized in connection with a magneto generator, it should be also apparent that the same apparatus can be utilized when forming a DC motor, which also has permanent magnets associated with a coil.

The magnetizing and testing apparatus for magnetizing the segments 23, testing the results of the magnetization and sensing the location and size of the timing mark 24 is indicated generally by the reference numeral 26. This apparatus 26 includes a table 27 from which depends a support rod 28. Mounted at the lower end of the support rod 28 is a further mounting plate 29, which carries a pneumatic cylinder 31.

The cylinder 31 actuates a piston rod 32, which is reciprocated within a connecting joint 33 in the direction shown by the arrows. The piston rod 32 acts upon a lug 35 that is connected to a vertically extending support member 36. This support member has a pair of guides 37 and 38 that cooperate with a way 39 formed on the support rod 28 to restrain the movement of the support rod 36. A further plate mounting member 41 fixed to the support member 36 carries a rod-like member 42 which passes through an opening 43 in the upper plate 27.

Supported upon this upper plate 27 adjacent and around the opening 43 is a coil mounting assembly, indicated generally by the reference numeral 44. The mounting assembly 44 is comprised of a lower piece 45 and an upper sleeve 46. An internal passageway 47 is formed therein. Mounted on the mounting assembly 44 is a coil assembly comprised of a pair of coil members 48 and 49 are supported. A cooling medium can be circulated through the passageway 47 for cooling the apparatus and preventing overheating when the coils 48 is operating.

Fixed at the upper end of the rod 42 by means of a mounting rod 51 is a fixture 52. The fixture 52 is formed with a key that cooperates with the key-way in the rotor hub portion 25 so as to hold it in an accurately aligned position.

Positioned vertically above the table 27 and above the coil mounting assembly 44 and the mounted coils 48 and 49 is a position sensor, indicated generally by the reference numeral 53. As best seen in FIG. 2, this position sensor 53 is comprised of a pair of width sensors 53a and 53b which sense the circumferential extent and location of the timing mark 24. In addition, a height sensor 53c senses the height of the timing mark 24. In this way, it is possible to determine the circumferential location, circumferential extent and height of the timing mark 24 to insure that the magnetization is in the correct circumferential alignment with the angular position of the rotor 21 when attached to the associated engine.

The sensors 53 may be contact-type linear displacement sensors such as electric micrometers, which employ the principal of a differential transformer in which the induction is changed due to displacement is converted into electric motive force as an output. This insures that the hub section 25 of the rotor is accurately positioned relative to the shell 22.

This hub to shell connection is frequently done by rivets at uniformly spaced angular intervals. Thus it may be possible to have misalignment by 120°. There is a possibility that such misalignment could cause contact with the sensors 53a, 53b and 53c and cause damage to them. Therefore, another micro switch (not shown) may be provided above these contact-type displacement sensors 53 so as to first detect the rough location of the timing mark 24 to prevent damage to the more fragile contact-type linear displacement sensors 53a, 53b and 53c.

Referring now primarily to FIG. 2, it will be seen that these sensors 53a, 53b and 53c have their outputs connected to a rotor position inspection section 54 which outputs a signal to a controller 55 that operates the apparatus 26 in the sequence of operation that will be described shortly by reference to FIGS. 3 and 4–10.

Also provided is a magnetization control section that controls the magnetization current, this being indicated by the reference numeral 56 and it operates on the magnetizing coil assembly 48. This controls the source of current from a DC power source 57. The controller 55 also controls this magnetization control section 56.

Finally, the detecting coil assembly 49 which checks the resulting magnetization outputs its signal to a section 57 which returns a resultant calculation to the controller 55.

Finally, the controls 55 also has a lift control section 59, which controls the hydraulic cylinder 31.

Operation

Figure 3:
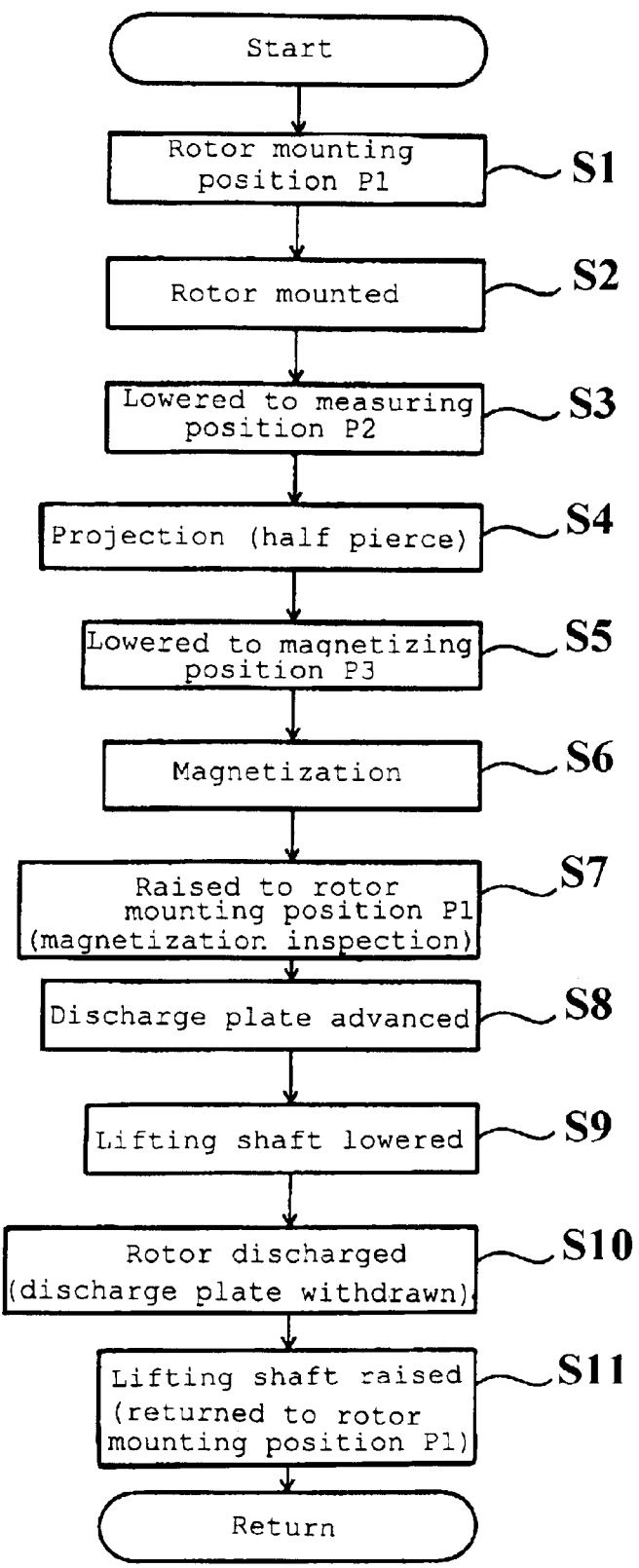
FIG. 3 is a block diagram showing the operational routine.

The operation of the apparatus 26 will now be disclosed by particular reference to the sequence steps shown in FIG. 3 and the corresponding positions of the components shown in FIGS. 4 through 10. The program starts and the controller 55 activates the lift control 59 to move the rotor mounting apparatus and specifically the rod 42 to an elevated position P1 at the step S1.

Then the flywheel magneto 21 is mounted onto the fixture 52 on the upper end of the rod 42. The flywheel magneto 21 is moved in an axial direction so as to achieve this mounting as seen in the phantom and solid views in FIG. 4.

The program then moves to the step S2 to confirm that the flywheel magneto 21 has been mounted and then at the step S3 lowers the flywheel magneto 21 to position P2 in registry with the sensor assembly 53 so as to check the location of the timing mark 24 by the sensors 53a, 53b and 53c. As previously noted, there may be a preposition sensing step before the rotor 21 is lowered into proximity with the sensors 53a–c.

At the step S4, the sensors 53a–c output their signals to the position inspection section 54 and conveys the information to the remainder of the controller 55.

The program then continues to the step S5 where the cylinder 31 is again activated to lower the flywheel magneto 21 into the magnetizing and inspection position P3. In this position, the magnetic segments 23 are brought into position with the magnetizing coil 48. The magnetization is controlled by the controller 55 delivering electrical power from the DC power source 57 to the coil assembly 48 under the control of the magnetization control 56. This takes place at the step S6.

Figures 4, 5, 6, 7:
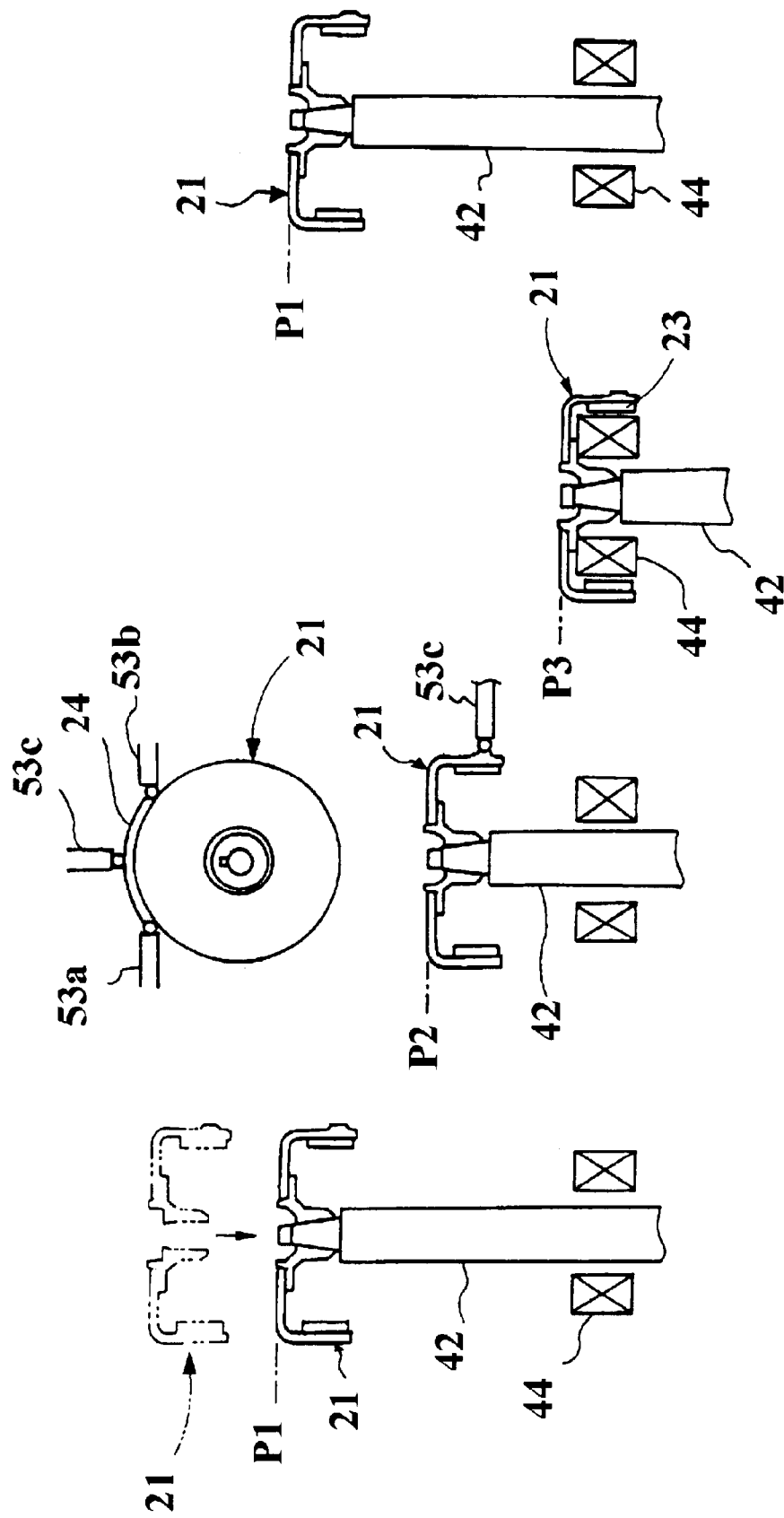
FIG. 4 is a view in part similar to FIG. 1, but shows the first step in the process.
FIG. 5 is a view similar to FIG. 2 and shows the second step in the process.
FIG. 6 is a further view showing the magnetizing step.
FIG. 7 is a further view showing the movement of the device to affect the testing of the magnetization and to place the finished tested component in a position for removal.

Having completed the magnetization, the controller then operates the lift control 59 to move the cylinder 31 and piston rod 32 and lift rod 42 upwardly to move the flywheel magneto 21 back to the P1 position (FIG. 7). As the rotor 21 and specifically the magnetic sections 23 which are now magnetized move away from the testing coil section 49, a current is outputted. This all occurs at the step S7.

The magnetization inspection section 58 then transmits the information to the remainder of the controller 55 and it is verified that the proper magnetization has occurred. Then at the step S8, a discharge plate 61 (FIG. 8) is extended so that a slotted portion 62 lies beneath the elevated flywheel magneto 21, which is still in the position P1.

Once the discharge plate 61 is in position, then the lift rod 42 is again lowered by the lift control 59 actuation of the cylinder 31 at the step S9. Then, a pusher assembly (shown in phantom in FIG. 9) indicated by the reference numeral 63 is activated so as to push the flywheel magneto 21 from the plate 61 to a discharge conveyor 64. This occurs at the step S10. The discharge conveyor 64 delivers the rotor 21 to either a good bin or a reject bin depending upon the results of the various testing, all performed in the same apparatus.

Then, the program moves to the step S11 so as again elevate the lift rod 42 into a position shown in FIG. 10 where another rotor 21 may be assembled onto it for testing. The program then repeats.

Thus, it should be apparent from the foregoing description that the described apparatus and test procedure are very effective in permitting not only magnetization of the segments of magnetic material placed on the cylindrical shell, but also testing of the effect of the magnetization while moving out of the magnetization position. In addition, the location of the magnetic segments relatively to the key-way of the rotor is also measured in the same section, thus permitting a quicker and less expensive way of performing these operations heretofore.

Of course, the foregoing description is that of preferred embodiments of the invention and various changes and modifications may be made without departing from the spirit and scope of the invention, as defined by the appended claims.

What is claimed is:

1. A method for magnetizing a plurality of circumferentially spaced magnetic materials mounted on a cylindrical body and testing the results, comprising the steps of placing a plurality of circumferentially spaced magnetic materials on a cylindrical surface, magnetizing the plurality of circumferentially spaced magnetic materials in an apparatus and testing the results in the same apparatus by a testing coil assembly in which a voltage is generated as the cylindrical body is moved.

2. The method as set forth in claim 1 wherein the magnetization takes place within a magnetizing coil assembly by passing an electrical current through said magnetizing coil assembly.

3. The method as set forth in claim 2 wherein the testing is done as the cylindrical body is removed from the magnetizing coil assembly.

4. The method as set forth in claim 3 wherein the cylindrical body is removed from the magnetizing coil assembly in the direction of the axis of the cylindrical body.

5. The method as set forth in claim 3 wherein the magnetizing coil assembly and the testing coil assembly are coaxially disposed.

6. The method as set forth in claim 5 wherein the testing coil assembly encircles the magnetizing coil assembly.

7. The method as set forth in claim 4 wherein the magnetic materials are magnetized so that adjacent of the circumferentially spaced magnetic materials have opposite polarities for use in connection with a relatively rotatable series of electrical coils to form a rotating electrical machine.

8. The method as set forth in claim 1 further including the step of forming a timing mark on the cylindrical body before it is placed in the apparatus.

9. The method as set forth in claim 8 further including the step of sensing the condition of the timing mark in the apparatus.

10. The method as set forth in claim 9 wherein the condition of the timing mark sensed is its angular position.

11. The method as set forth in claim 9 wherein the condition of the timing mark sensed is its angular extent.

12. The method as set forth in claim 9 wherein the condition of the timing mark sensed is its radial height.

13. The method as set forth in claim 12 wherein the angular position of the timing mark sensed is also sensed.

14. The method as set forth in claim 13 wherein the angular extent of the timing mark is also sensed.

15. The method as set forth in claim 14 wherein the magnetization takes place within a magnetizing coil assembly by passing an electrical current through said magnetizing coil assembly.

16. The method as set forth in claim 15 wherein the testing is done as the cylindrical body is removed from the magnetizing coil assembly.

17. The method as set forth in claim 16 wherein the cylindrical body is removed from the magnetizing coil assembly in the direction of the axis of the cylindrical body.

18. The method as set forth in claim 16 wherein the testing is done by a testing coil assembly in which a voltage is generated as the cylindrical body is moved.

19. The method as set forth in claim 18 wherein the magnetizing coil assembly and the testing coil assembly are coaxially disposed.

20. The method as set forth in claim 19 wherein the testing coil assembly encircles the magnetizing coil assembly.

21. The method as set forth in claim 1 wherein the magnetic materials are magnetized so that adjacent of the circumferentially spaced magnetic materials have opposite polarities for use in connection with a relatively rotatable series of electrical coils to form a rotating electrical machine.

22. An apparatus for magnetizing a plurality of circumferentially spaced magnetic materials mounted on a cylindrical body and testing the results, said apparatus comprising a conveying device for moving the cylindrical body and attached, a magnetizing device, a magnetic testing device comprising a testing coil assembly and a control for operating said conveying device to place said cylindrical body and attached circumferentially spaced magnetic materials into said magnetizing device and operate said magnetizing device to magnetize said magnetic materials and then moving said cylindrical body and attached circumferentially spaced magnetic materials relative to said testing coil assembly to generate a voltage in said testing coil assembly.

23. The apparatus as set forth in claim 22 wherein magnetizing device comprises a magnetizing coil assembly.

24. The apparatus as set forth in claim 23 wherein the testing is done as the cylindrical body is removed from the magnetizing coil assembly.

25. The apparatus as set forth in claim 24 wherein the conveying device moves the cylindrical body the direction of the axis of the cylindrical body.

26. The apparatus as set forth in claim 25 wherein the magnetic materials are magnetized so that adjacent of the circumferentially spaced magnetic materials have opposite polarities for use in connection with a relatively rotatable series of electrical coils to form a rotating electrical machine.

27. The apparatus as set forth in claim 24 wherein the testing device comprises a testing coil assembly in which a voltage is generated as the cylindrical body is moved.

28. The apparatus as set forth in claim 27 wherein the magnetizing coil assembly and the testing coil assembly are coaxially disposed.

29. The apparatus as set forth in claim 28 wherein the testing coil assembly encircles the magnetizing coil assembly.

30. The apparatus as set forth in claim 22 wherein a timing mark is formed on the cylindrical body and the apparatus further includes a sensing device for sensing the condition of the timing mark.

31. The apparatus as set forth in claim 30 wherein the condition of the timing mark sensed is its angular position.

32. The apparatus as set forth in claim 30 wherein the condition of the timing mark sensed is its angular extent.

33. The apparatus as set forth in claim 30 wherein the condition of the timing mark sensed is its radial height.

34. The apparatus as set forth in claim 33 wherein the angular position of the timing mark sensed is also sensed.

35. The apparatus as set forth in claim 33 wherein the angular extent of the timing mark is also sensed.

36. The apparatus as set forth in claim 35 wherein magnetizing device comprises a magnetizing coil assembly.

37. The apparatus as set forth in claim 36 wherein the testing is done as the cylindrical body is removed from the magnetizing coil assembly.

38. The apparatus as set forth in claim 37 wherein the conveying device moves the cylindrical body the direction of the axis of the cylindrical body.

39. The apparatus as set forth in claim 37 wherein the testing device comprises a testing coil assembly in which a voltage is generated as the cylindrical body is moved.

40. The apparatus as set forth in claim 39 wherein the magnetizing coil assembly and the testing coil assembly are coaxially disposed.

41. The apparatus as set forth in claim 40 wherein the testing coil assembly encircles the magnetizing coil assembly.

42. The apparatus as set forth in claim 22 wherein the magnetic materials are magnetized so that adjacent of the circumferentially spaced magnetic materials have opposite polarities for use in connection with a relatively rotatable series of electrical coils to form a rotating electrical machine.

* * * * *